Figure 1:
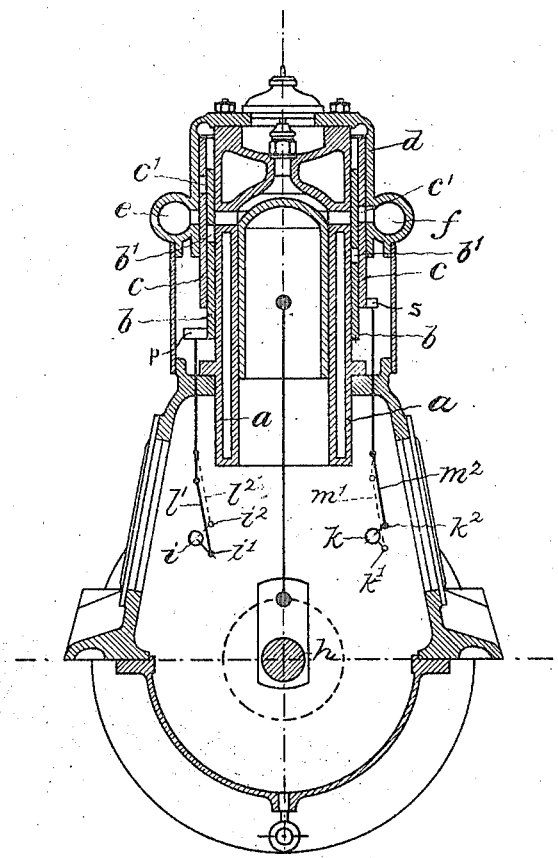

W. P. VAN LAMMEREN.
INTERNAL COMBUSTION ENGINE WITH SLEEVE DISTRIBUTION.
APPLICATION FILED MAR. 25, 1913.

1,197,975.  Patented Sept. 12, 1916.

UNITED STATES PATENT OFFICE.

WILHELMUS PETRUS VAN LAMMEREN, OF WARMOND, NEAR LEIDEN, NETHERLANDS.

INTERNAL-COMBUSTION ENGINE WITH SLEEVE DISTRIBUTION.

1,197,975.  Specification of Letters Patent.  Patented Sept. 12, 1916.

Application filed March 25, 1913. Serial No. 756,722.

*To all whom it may concern:*

Be it known that I, WILHELMUS PETRUS VAN LAMMEREN, a subject of the Queen of the Netherlands, residing at Warmond, near Leiden, Netherlands, have invented certain new and useful Improvements in Internal-Combustion Engines with Sleeve Distribution; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to internal combustion engines of the type in which the admission and exhaust are controlled by sliding sleeves. In machines of this type the sleeve, or sleeves when two are used is or are arranged inside the cylinder between the piston and the cylinder wall. This arrangement has the drawback of not providing sufficient cooling and lubrication, and of causing a considerable loss of power owing to the transverse pressure of the piston during the power and compression strokes. This is also the cause of considerable wear of the moving parts whereby the sleeves soon become leaky, and the efficiency of the machine rapidly falls. This draw-back is intensified by the inefficient means of driving the sleeves which tends to increase the pressure of the same against the cylinder walls. With high speed piston engines, the inlet and exhaust ports should be quickly opened and closed in order to obtain correct admission, etc., of the gas mixture. For answering these conditions sleeves may be used, which are arranged in such a way as to be concentric with the cylinder, these sleeves being reliable and working in a very smooth manner. Usually each cylinder is provided with two of such sleeves, the advantage of this arrangement being that with a four stroke engine the sleeve may be driven by eccentrics; however, a single sleeve may be used for the same purpose, especially with two stroke engines.

It has been proved that but few of the theoretical advantages of the sleeves are realized in practice. The known constructions are either so inefficient with regard to the total arrangement of the engine that they cannot be considered as suitable for practical application, or very soon after the engine has been put into service the sleeves will show one-sided wear, resulting in looseness and loss of efficiency. The one-sided wear of the sleeves is caused by not arranging or driving them in the correct manner, that is, the force driving the sleeves is not parallel with the direction of the sleeve-motion; the driving mechanism acts only on one side of each sleeve, one-sided wear resulting in this case from the inertia and the friction of the sleeve; or both cases are combined.

The object of the present invention is to provide a mechanism for driving one or two sleeves, which are so arranged as to be concentric with the cylinder and to which a reciprocating motion is imparted in such a way that lateral forces acting on the sleeve or the sleeves, those resulting from inertia as well as those resulting from the driving force, are totally avoided without the engine being built up in a complicated manner or difficult to be controlled or to be taken to pieces. This advantage is realized by driving the sleeves by means of two secondary shafts, acting by means of eccentrics or the like on each sleeve in two points, being diametrical relative to the center line of the sleeve.

The invention will be explained here with regard to the accompanying drawing which illustrates a form of execution as applied to an engine with two sleeves, the latter being concentric with the cylinder and sliding one within the other.

Figure 2:
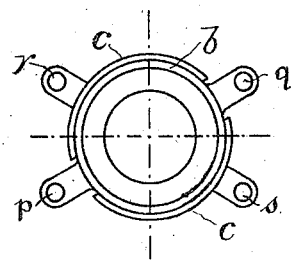

Figure 1 shows the motor in cross section; Fig. 2 shows the way in which the driving mechanism acts on each of the sleeves.

On the external wall $a$ of the hollow walled cylinder works the inner sleeve $b$, and on the outer surface of the latter the external sleeve $c$ works. The external sleeve of the cylinder is surrounded by a casting $d$ bolted to the cylinder. The external sleeve $c$ slides against the inner surface of the casting $d$, while the charge mixture is admitted through the space $e$, and the exhaust gases led away through the corresponding space $f$. The gases flow into and out of the cylinder through slots or ports $b'$, $c'$, in the sleeves $b$, $c$, respectively.

The sleeves $b$ and $c$ are reciprocated by means of two secondary shafts $i$ and $k$ arranged parallel to the engine shaft $h$ and may be driven from the latter at half the speed of the engine shaft by any suitable gearing, not shown. Each secondary shaft $i, k$, is provided with two cranks as eccentrics $i', i^2$, and $k', k^2$ respectively. The cranks $i', k'$, are connected to the sleeve $b$ by articulated rods $l', m'$, at the points $p, q$, which are placed diametrically relative to the center of the sleeve, Fig. 2. The outer sleeve $c$ is driven in a like manner by the cranks $i^2, k^2$, which are connected to the sleeve $c$ by articulated rods $l^2, m^2$, at the points $r, s$, which are placed diametrically relative to the center of the sleeve.

It is obvious that there can be no force which acts on the sleeves in a lateral direction and all lateral influence of the driving means is excluded. This is obtained by the double drive arranged at diametrically opposite points and by vertically guiding in the frame of the engine the parts of the articulated rods which are directly connected to the sleeves. The points, at which the rods are connected to the sleeves are disposed at angles less than 90° to the center plane perpendicular to the axis of the engine shaft.

I claim—

An internal combustion engine comprising a cylinder having inlet and exhaust ports therein, independently operable concentric sleeves surrounding the cylinder for controlling said ports, a shaft on each side of the engine shaft, and articulated rods connected to the crank shafts having their upper portions vertically guided in the engine frame and connected to the sleeves at diametrically opposite points disposed at angles less than 90 degrees to the center plane perpendicular to the axis of the engine shaft.

In testimony that I claim the foregoing as my invention, I have signed my name in presence of two subscribing witnesses.

WILHELMUS PETRUS van LAMMEREN.